United States Patent
Asai et al.

(10) Patent No.: US 9,501,077 B2
(45) Date of Patent: Nov. 22, 2016

(54) DIODE LOAD DRIVING POWER SUPPLY APPARATUS

(71) Applicant: Murata Manufacturing Co., Ltd., Nagaokakyo-shi, Kyoto-fu (JP)

(72) Inventors: Hirotsugu Asai, Nagaokakyo (JP); Hironori Matsumoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 165 days.

(21) Appl. No.: 14/601,366

(22) Filed: Jan. 21, 2015

(65) Prior Publication Data

US 2015/0130516 A1  May 14, 2015

Related U.S. Application Data

(63) Continuation of application No. PCT/JP2013/069096, filed on Jul. 12, 2013.

(30) Foreign Application Priority Data

Jul. 23, 2012 (JP) ................................ 2012-162613

(51) Int. Cl.
  *G05F 1/614* (2006.01)
  *H02M 3/335* (2006.01)
  *H05B 33/08* (2006.01)
  *G05F 1/46* (2006.01)

(52) U.S. Cl.
  CPC .............. *G05F 1/614* (2013.01); *G05F 1/467* (2013.01); *H02M 3/33561* (2013.01); *H05B 33/0815* (2013.01); *Y02B 20/346* (2013.01)

(58) Field of Classification Search
  None
  See application file for complete search history.

(56) References Cited

U.S. PATENT DOCUMENTS

| 6,178,100 B1* | 1/2001 | Kitano | H02M 3/3385 363/19 |
|---|---|---|---|
| 2013/0175934 A1 | 7/2013 | Fujita | |
| 2014/0008981 A1* | 1/2014 | Asai | H02M 3/33507 307/31 |
| 2014/0146577 A1* | 5/2014 | Uno | H02M 3/33561 363/21.02 |

FOREIGN PATENT DOCUMENTS

| JP | 2011-124195 A | 6/2011 |
| JP | 2011-198913 A | 10/2011 |
| WO | 2012/020615 A1 | 2/2012 |

OTHER PUBLICATIONS

Official Communication issued in International Patent Application No. PCT/JP2013/069096, mailed on Sep. 3, 2013.

* cited by examiner

*Primary Examiner* — Jany Richardson
(74) *Attorney, Agent, or Firm* — Keating & Bennett, LLP

(57) ABSTRACT

A main rectifying/smoothing circuit is connected to one end of a secondary winding of a transformer and a plurality of rectifying/smoothing circuits are connected to a plurality of central taps of the secondary winding. The rectifying/smoothing circuits are each equipped with a switch. In a preliminary driving period, a DSP, which controls the switches, reads forward drop voltages of first to third diode loads and sets feedback gains corresponding to the forward drop voltages. The DSP controls the switches based on the set feedback gains and begins rated driving.

15 Claims, 6 Drawing Sheets

DIODE LOAD DRIVING POWER SUPPLY APPARATUS

BACKGROUND OF THE INVENTION

1. Field of the Invention

The present invention relates to a diode load driving power supply apparatus that supplies power to a plurality of diode loads in order to drive the diode loads.

2. Description of the Related Art

In Japanese Unexamined Patent Application Publication No. 2011-124195, there is disclosed a lighting circuit that lights a plurality of LEDs. The circuit described in Japanese Unexamined Patent Application Publication No. 2011-124195 has a configuration in which a DC-DC converter is provided for each of the plurality of LEDs. It is described that, with this configuration, a stable current is supplied to each of the LEDs and therefore lighting of the LEDs can be accurately controlled and the LEDs can be prevented from flickering, for example.

When a plurality of diode loads are controlled in a unified manner using a single controller in a state where there are variations between their forward drop voltages VF, a problem occurs in that an overshoot or rise delay is generated in the current rise characteristics at the time of start up. This is a problem that causes noise to be generated on the load side and affects the load-side characteristics when the LEDs are used as the light source of a projector, for example. In addition, if the overshoot becomes large, there is a risk that the rated current will be exceeded and the light source will be degraded. Since the forward drop voltage of the LEDs is not recognized or considered in Japanese Unexamined Patent Application Publication No. 2011-124195, this problem cannot be solved by Patent Japanese Unexamined Patent Application Publication No. 2011-124195.

SUMMARY OF THE INVENTION

Accordingly, preferred embodiments of the present invention provide a diode load driving power supply apparatus that is capable of significantly reducing or preventing variations in a rise characteristic at a time of start up such as an overshoot caused by the effect of variations in the forward drop voltages VF of the diode loads.

A diode load driving power supply apparatus according to a preferred embodiment of the present invention includes a plurality of switch circuits that each rectify, smooth and then output a voltage to a diode load through switching of a switch element, and a controller configured or programmed to control switching of the switch elements of the plurality of switch circuits and subject the plurality of diode loads to rated driving based on feedback gains, which are each a ratio of change in an on period or an on period ratio of the corresponding switch element with respect to a difference between a current supplied to the corresponding diode load and a desired current value. The controller is configured or programmed to control switching of the switch elements of the switch circuits, and subject the diode loads to preliminary driving by supplying a current equal to or below a rated current, obtain information regarding forward drop voltages of the diode loads in a preliminary driving period, and set feedback gains of the switch elements of the switch circuits respectively connected to the diode loads in accordance with the forward drop voltages of the diode loads.

With this configuration, feedback gains are set to correspond to the individual forward drop voltages even when there are variations between the forward drop voltages VF of the plurality of diode loads. Consequently, when the diode loads are lit by supplying a rated current, start up variations such as an overshoot generated in the rise of a current flowing through a diode load are significantly reduced or prevented in each diode load. In addition, in the preliminary driving in which the forward drop voltages are obtained, since a current equal to or less than the rated current is only supplied to the diode loads for a short period of time which is the start up initial period, there is no problem in terms of visual perception.

The controlled preferably is configured or programmed to set, as feedback gains for switching control of the switch elements, smaller feedback gains as the forward drop voltages of the diode loads decrease.

With this configuration, start up variations such as an overshoot generated in a rise of a current flowing through a diode load are significantly reduced or prevented for each diode load by setting smaller feedback gains for smaller forward drop voltages.

It is preferable that the controller be configured or programmed to possess in advance a plurality of feedback gains.

With this configuration, there is no need for the controller to perform arithmetic processing of the feedback gains.

It is preferable that the controller be configured or programmed to determine the number of diodes used in each of the plurality of diode loads from the information regarding forward drop voltages and select one combination of feedback gains from among combinations of feedback gains possessed in advance.

With this configuration, it is easy to set optimum feedback gains even when there are different numbers of diodes.

It is preferable that the controller be configured or programmed to obtain the on periods or on duty ratios of the switch elements as the information regarding the forward drop voltages.

With this configuration, information regarding the forward drop voltages is acquired within the controller without directly detecting information regarding the forward drop voltages of the diode loads.

According to various preferred embodiments of the present invention, start up variations such as an overshoot generated in the rise of a current flowing through a diode load are significantly reduced or prevented for every diode load even when there are variations between the forward drop voltages of a plurality of diode loads.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the preferred embodiments to be described below, a case will be described in which a diode load driving power supply apparatus of the present invention is preferably used as a power supply apparatus of a light source of a projector, for example.

Preferred Embodiment 1

Figure 1:
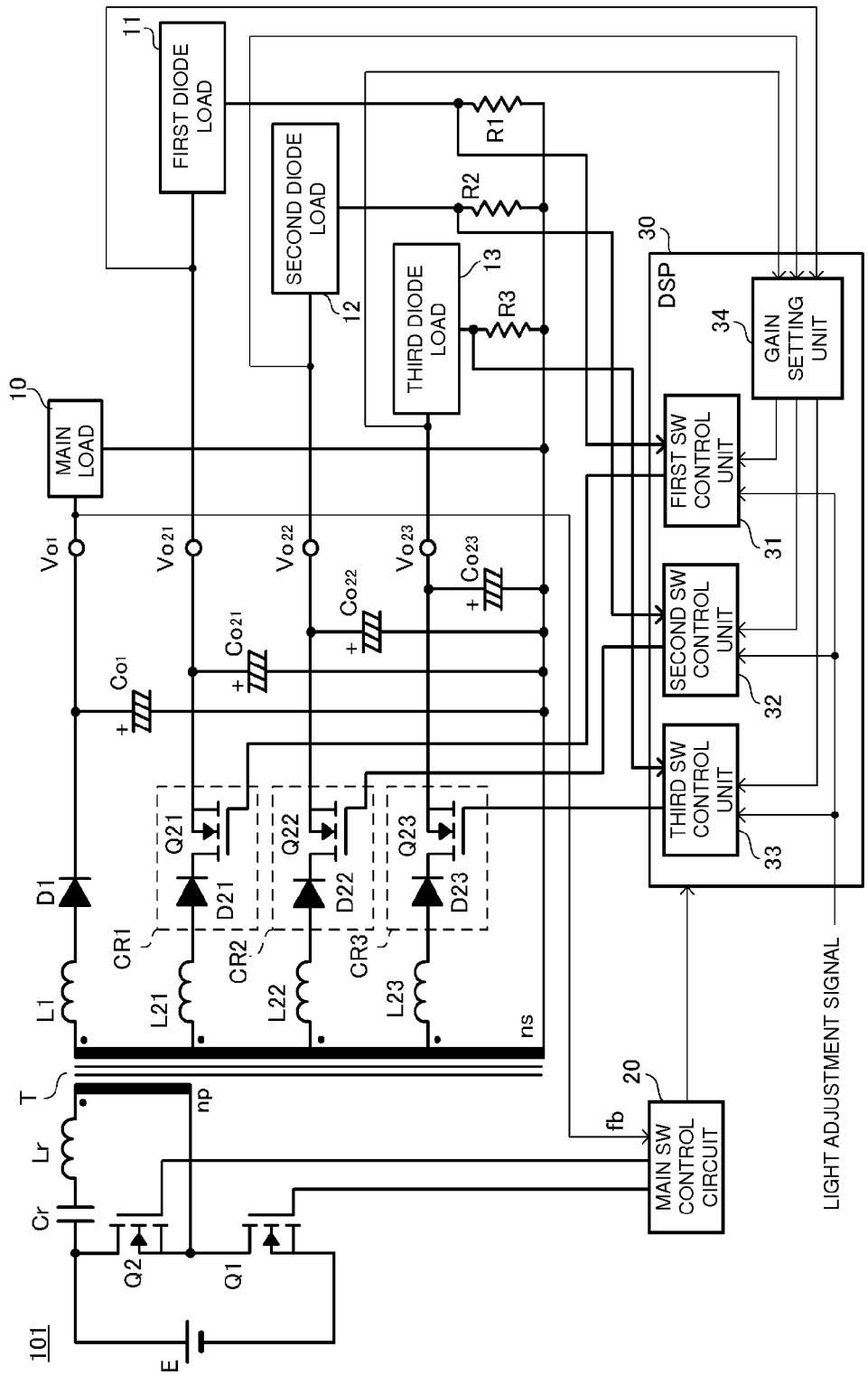
FIG. 1 is a circuit diagram of a diode load driving power supply apparatus according to preferred embodiment 1 of the present invention.

FIG. 1 is a circuit diagram of a diode load driving power supply apparatus according to preferred embodiment 1 of the present invention. A diode load driving power supply apparatus 101 according to this preferred embodiment includes a transformer T equipped with a primary winding np and a secondary winding ns. The diode load driving power supply apparatus 101 is equipped with an input power supply E on the primary side of the transformer T and is equipped with a main load 10, a first diode load 11, a second diode load 12 and a third diode load 13 on the secondary side of the transformer T.

A low-side switch element Q1 is connected in series with the primary winding np. In addition, a high-side switch element Q2, a resonance capacitor Cr and inductor Lr are connected to the primary winding np and define a closed loop. The circuit defined by the low-side switch element Q1, the high-side switch element Q2 and so on causes a current to flow forwards and backwards in the primary winding np by turning the low-side switch element Q1 and the high-side switch element Q2 on and off in a complementary manner with a dead time between the on periods. In this way, an induced voltage is generated in the secondary winding ns of the transformer T.

A main rectifying/smoothing circuit is connected to one end of the secondary winding. The main rectifying/smoothing circuit includes an inductor L1, a first rectifying element D1 and a smoothing capacitor $Co_1$, which are connected to one another. The main rectifying/smoothing circuit rectifies and smoothes the induced voltage from the secondary winding ns and generates a main output voltage $Vo_1$. The main load 10 is connected downstream of the main rectifying/smoothing circuit and the main output voltage $Vo_1$ is supplied to the main load 10. The main output voltage $Vo_1$ supplied to the main load 10 is determined by control of switching of the low-side switch element Q1 and the high-side switch element Q2.

A DC-DC converter, which is not illustrated, is provided between the main rectifying/smoothing circuit and the main load 10, and for example, steps down the voltage output from the main rectifying/smoothing circuit from about 12 V to about 3 V and supplies the stepped down voltage to the main load 10.

The secondary winding ns includes a plurality of center taps. First, second and third rectifying/smoothing circuits are connected to the center taps. These rectifying/smoothing circuits each correspond to a switch circuit according to a preferred embodiment of the present invention.

The first rectifying/smoothing circuit includes an inductor L21 connected to a center tap of the secondary winding ns, a first switching circuit CR1 and a smoothing capacitor $Co_{21}$. The first switching circuit CR1 includes a diode D21 and a switch element Q21. The first rectifying/smoothing circuit switches and then rectifies and smoothes the induced voltage from the center tap of the secondary winding ns and thus generates an output voltage $Vo_{21}$. The first diode load 11 is connected downstream of the first rectifying/smoothing circuit and the output voltage $Vo_{21}$ is supplied to the first diode load 11.

The second rectifying/smoothing circuit includes an inductor L22 connected to a center tap of the secondary winding ns, a second switching circuit CR2 and a smoothing capacitor $Co_{22}$. The second switching circuit CR2 includes a diode D22 and a switch element Q22. The second rectifying/smoothing circuit switches and then rectifies and smoothes the induced voltage from the center tap of the secondary winding ns and thus generates an output voltage $Vo_{22}$. The second diode load 12 is connected downstream of the second rectifying/smoothing circuit and the output voltage $Vo_{22}$ is supplied to the second diode load 12.

The third rectifying/smoothing circuit includes an inductor L23 connected to a center tap of the secondary winding ns, a third switching circuit CR3 and a smoothing capacitor $Co_{23}$. The third switching circuit CR3 includes a diode D23 and a switch element Q23. The third rectifying/smoothing circuit switches and then rectifies and smoothes the induced voltage from the center tap of the secondary winding ns and thus generates an output voltage $Vo_{23}$. The third diode load 13 is connected downstream of the third rectifying/smoothing circuit and the output voltage $Vo_{23}$ is supplied to the third diode load 13.

Each of the inductors L1, L21, L22 and L23 delays the rise of a current flowing downstream from the secondary winding ns generated by the induced voltage. These inductors L1, L21, L22 and L23 may be leakage inductances of the transformer T or may be actual external components, for example. If there is no need to delay the rise, the inductors are not necessary.

The diode load driving power supply apparatus 101 is equipped with a main switching control circuit (hereafter, main SW control circuit) 20 that controls switching of the low-side switch element Q1 and the high-side switch element Q2 on the primary side of the transformer T. A feedback signal fb corresponding to the main output voltage $Vo_1$ is input to the main SW control circuit 20. Although not illustrated, the feedback signal fb is fed back from the secondary side to the primary side via an isolation device such as a photocoupler. The main SW control circuit 20 performs control to alternately turn the low-side switch element Q1 and the high-side switch element Q2 on and off with a short dead time between the on periods on the basis of the feedback signal fb in order to stabilize the main output voltage $Vo_1$.

The diode load driving power supply apparatus 101 is equipped with a digital signal processor (DSP) 30. The DSP 30 (second controller) has a plurality of functions such as those of a first SW controller 31, a second SW controller 32, a third SW controller 33, and a gain setter 34. The DSP may be defined by a micro controller (MCU), for example. The first SW controller 31, the second SW controller 32 and the third SW controller 33 preferably operate in the same way as one another. Therefore, hereafter, description will be given for the first SW controller 31 and the corresponding symbols of the second SW controller 32 and the third SW controller 33 will be indicated in parenthesis.

The first SW controller 31 (32, 33) is configured or programmed to control switching of the switch element Q21

(Q22, Q23). The first SW controller 31 (32, 33) is configured or programmed to control cause the first diode load 11, the second diode load 12 and the third diode load 13 to be lit using switching control, and subject the first diode load 11 (12, 13) to preliminary driving in which a current equal to or less than the rated current is supplied in a preliminary driving period, which is a start up initial period, provided before the start of main driving.

The gain setter 34 reads a forward drop voltage VF of the first diode load 11 (12, 13) in the preliminary driving period. Reading of the forward drop voltage VF may be performed by the DSP 30 using a method that determines a difference in the on duty ratio at the time of start up of the switching element or the DSP 30 may obtain a forward drop voltage VF detected by another circuit. The gain setter 34 sets a feedback gain that corresponds to the forward drop voltage VF.

The feedback gain is the ratio of change in the on period or the on period ratio of the switch element Q21 (Q22, Q23) with respect to the difference between a measured value of a current flowing through the first diode load 11 (12, 13) (hereafter, load current) and a desired current value.

The gain setter 34 may obtain and set a feedback gain corresponding to the forward drop voltage VF from among feedback gains determined from experiments or experience and stored in advance in a storage device or may set a feedback gain calculated using a computational formula. The gain setter 34 outputs the set feedback gain to the first SW controller 31 (32, 33) corresponding to the forward drop voltage VF used in the setting operation.

The first SW controller 31 (32, 33) is configured or programmed to control switching of the switch element Q21 (Q22, Q23) based on the feedback gain set by the gain setter 34 and start main driving of the first diode load 11 (12, 13).

The on duty ratio of the switch element Q21 (Q22, Q23) whose switching is controlled by the first SW controller 31 (32, 33) is set by constant current driving of the first SW controller 31 (32, 33). Specifically, the first SW controller 31 (32, 33) is configured or programmed to detect a load current from a current detection resistor R1 (R2, R3) connected to the first diode load 11 (12, 13). In addition, a light adjustment signal is input to the first SW controller 31 (32, 33). The first SW controller 31 (32, 33) is configured or programmed to control switching of the switch element Q21 (Q22, Q23) such that the load current remains at a desired current value determined based on the light adjustment signal.

Here, at the time of starting of main driving, the first SW controller 31 (32, 33) controls switching of the switch element Q21 (Q22, Q23) based on the feedback gain set in accordance with the forward drop voltage VF of the first diode load 11 (12, 13). Therefore, in the case where there are variations in forward drop voltages VF between the first diode load 11, the second diode load 12 and the third diode load 13, the first SW controller 31, the second SW controller 32 and the third SW controller 33 respectively control switching of the switch elements Q21, Q22 and Q23 using the corresponding different on duty ratios.

Thus, start up variations such as generation of an overshoot or rise delay in the rise of the load currents of the first diode load 11, the second diode load 12 and the third diode load 13 at the time of starting of main driving are significantly reduced or prevented. In the case where there are no differences in the forward drop voltage VF, the same start up characteristics are obtained when the same gain is used.

Figure 2:
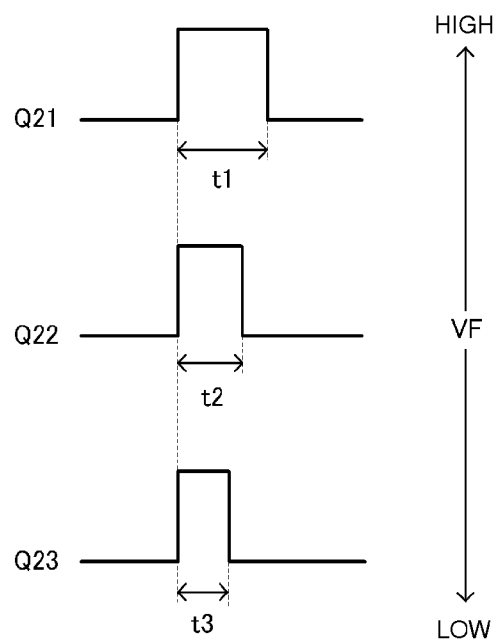
FIG. 2 illustrates a relationship between an on duty ratio of each switch element of the diode load driving power supply apparatus and VF.

FIG. 2 illustrates a relationship between the on duty ratio of each switch element of the diode load driving power supply apparatus 101 and VF. Differences between the on duty ratios of the switch elements are generated in accordance with differences between the forward drop voltages VF. FIG. 2 illustrates that in the case where the forward drop voltages VF of the first diode load 11, the second diode load 12 and the third diode load 13 become smaller in this order, the on period t1 of the switch element Q21, the on period t2 of the switch element Q22 and the on period t3 of the switch element Q23 become shorter in this order.

The feedback gain determines the sweep rate of the on duty ratio. The gain is determined in accordance with the forward drop voltage VF and as a result the sweep rate of the on duty ratio is changed and rise variations of the load current are significantly reduced or prevented.

Figure 3:
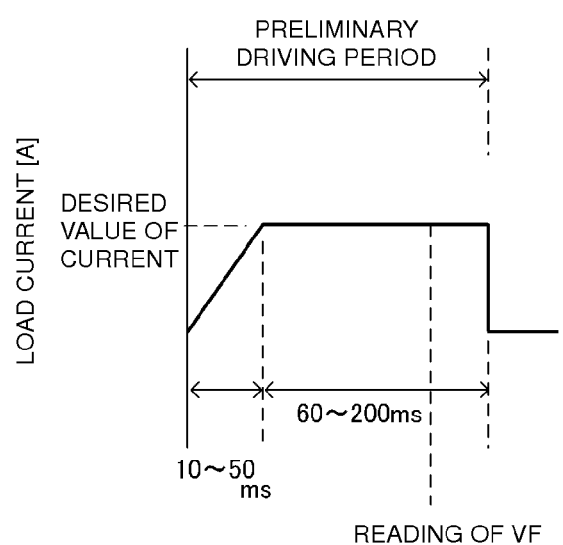
FIG. 3 illustrates a waveform of a load current of a diode in a preliminary driving period.

FIG. 3 illustrates a waveform of a load current of a diode in the preliminary driving period.

The first SW controller 31 (32, 33) of the DSP 30 controls switching of the switch element Q21 (Q22, Q23) such that the load currents of the first diode load 11, the second diode load 12 and the third diode load 13 take a time of, for example, about 10 ms to about 50 ms to rise. Since the preliminary driving period is just the start up initial period and is a short period of time, the preliminary driving period can be made slower than the rise characteristic of the main driving period and generation of overshoot in the rise of the load current at the time of starting of the preliminary driving period is prevented.

Once the load current has reached the desired current value in the preliminary driving period, the first SW controller 31 (32, 33) controls switching of the switch element Q21 (Q22, Q23) such that constant current driving is performed for a certain period (for example, about 60 ms to about 200 ms). The gain setter 34 reads a forward voltage VF of the first diode load 11 (12, 13) at the time of constant current driving in the preliminary driving period. Then, the gain setter 34 sets the feedback gain. After that, the preliminary driving period ends and the load current becomes zero.

Figure 4:
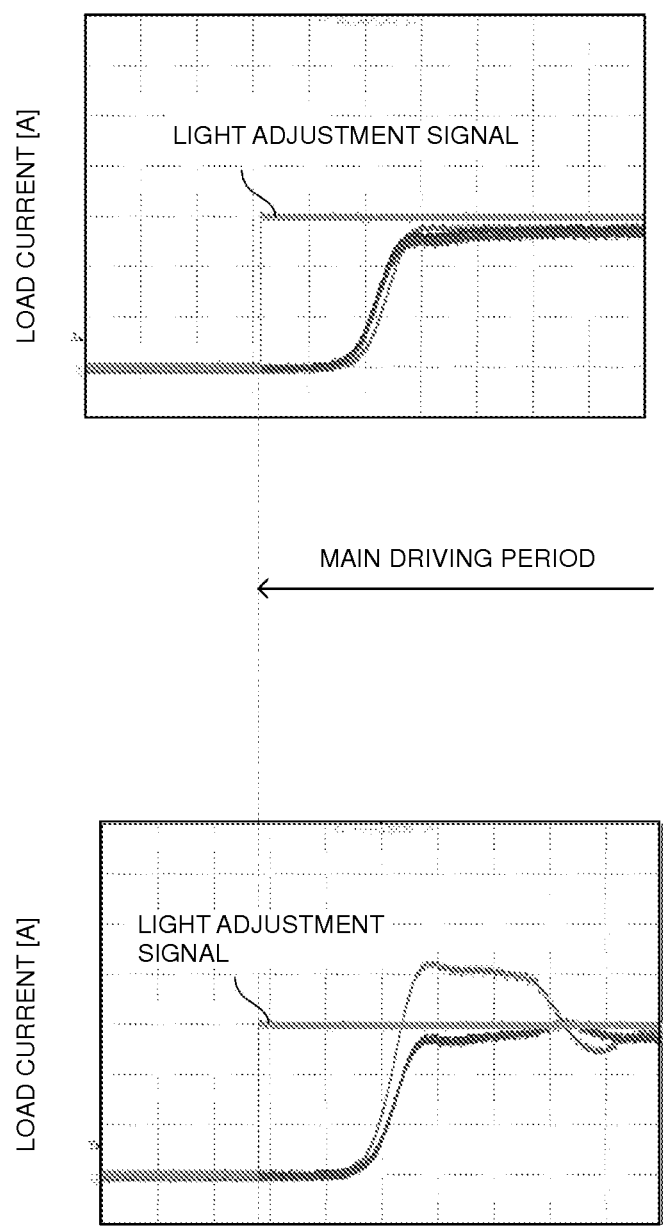
FIG. 4 illustrates a waveform of a load current at the time of main driving.

FIG. 4 illustrates the waveform of a load current at the time of main driving. In FIG. 4, the waveform of a load current in the case where the overshoot countermeasure of a preferred embodiment of the present invention is not performed is illustrated in the bottom portion of the figure to allow for comparison. In FIG. 4, a case is illustrated in which there is a difference of around 5 V between the forward drop voltages VF of the first diode load 11, the second diode load 12 and the third diode load 13. In addition, as illustrated in FIG. 4, at a timing at which a light adjustment signal is input, switching from an OFF state to an ON state in the main driving is performed and the DSP 30 begins the switching operation and controls the load currents.

As illustrated in the top portion of FIG. 4, in the case where switching of the switch elements Q21, Q22 and Q23 is controlled based on the feedback gains set in accordance with the forward drop voltages VF at the time of the start of main driving, overshoot and rise delay are not generated in the rises of the load currents. Consequently, the change in the currents at the time of the rise are the same for the first diode load 11, the second diode load 12 and the third diode load 13.

On the other hand, in the case where switching of the switch elements Q21, Q22 and Q23 is controlled using the same feedback gain in the main driving period in a state in which there are differences between the forward drop voltages VF, an overshoot is generated in the load current of an LD having a low forward drop voltage VF, and differences are generated in the change in current at the time of rise of the first diode load 11, the second diode load 12 and the third diode load 13.

Figure 5:
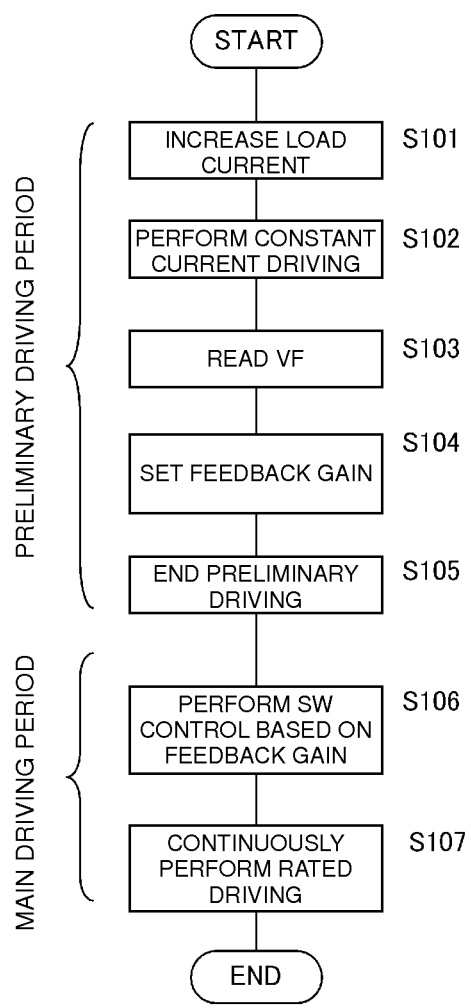
FIG. 5 is a flowchart illustrating operation of a DSP.

FIG. 5 is a flowchart illustrating operation of the DSP 30. The DSP 30 executes the operation illustrated in FIG. 5 by executing a stored program.

Once power is supplied to the diode load driving power supply apparatus 101, at the time of starting of the preliminary driving period, the first SW controller 31 (32, 33) of the DSP 30 begins controlling switching of the switch element Q21 (Q22, Q23) and for the first diode load 11 (12, 13), causes the load current of the first diode load 11 (12, 13) to rise in a period of, for example, about 10 ms to about 50 ms as illustrated in FIG. 2 (S101). After that, the first SW controller 31 (32, 33) of the DSP 30 controls switching of the switch element Q21 (Q22, Q23) such that a constant current (e.g., about 1.0 A) flows continuously for a certain period (for example, about 60 ms to about 200 ms) (S102).

The gain setter 34 of the DSP 30 reads the forward drop voltage VF of the first diode load 11 (12, 13) (S103). The gain setter 34 of the DSP 30 sets the feedback gain to be used in the main driving period in accordance with the read forward drop voltage VF (S104).

The first SW controller 31 (32, 33) of the DSP 30 stops controlling switching of the switch element Q21 (Q22, Q23) and ends the preliminary driving of the first diode load 11 (12, 13) (S105).

The first SW controller 31 (32, 33) of the DSP 30 starts controlling switching of the switch element Q21 (Q22, Q23) based on a light adjustment signal input from the outside and the set feedback gain (S106). Thus, main driving of the first diode load 11 (12, 13) is started. Generation of an overshoot or a rise delay in the rise of the load current is significantly reduced or prevented by controlling switching of the switch element Q21 (Q22, Q23) using a gain corresponding to the forward drop voltage VF.

For example, in the case where a forward drop voltage VF1 of the first diode load 11, a forward drop voltage VF2 of the second diode load 12 and a forward drop voltage VF3 of the third diode load 13 have the relationship VF2<VF3<VF1, the feedback gains set by the gain setter 34 increase in the order of that of the second SW controller 32, that of the third SW controller 33 and that of the first SW controller 31.

After that, the DSP 30 continuously performs rated driving of the first diode load 11 (12, 13) until a termination time such as when the power supply is turned off (S107).

As described above, the diode load driving power supply apparatus 101 according to this preferred embodiment is capable of significantly reducing or preventing generation of an overshoot and so forth in the rise of the load currents even when there are variations between the forward drop voltages VF of the first diode load 11, the second diode load 12 and the third diode load 13. Thus, effects on the load-side characteristics and degradation of the load itself caused by start up variations in the first diode load 11 (12, 13) are prevented.

In this preferred embodiment, the gain setter 34 sets the feedback gains based on the forward drop voltages VF read in the preliminary driving period, but may instead set the feedback gains based on the on periods (or on duty ratios) of the switch elements Q21, Q22 and Q23 in the preliminary driving period. For example, in the case where the forward drop voltage VF of the first diode load 11 (12, 13) is high, the on period of the switch element Q21 (Q22, Q23) becomes longer as a result of feedback control. Therefore, the gain setter 34 may set feedback gains corresponding to the lengths of the on periods of the switch elements Q21, Q22 and Q23.

Preferred Embodiment 2

Figure 6:
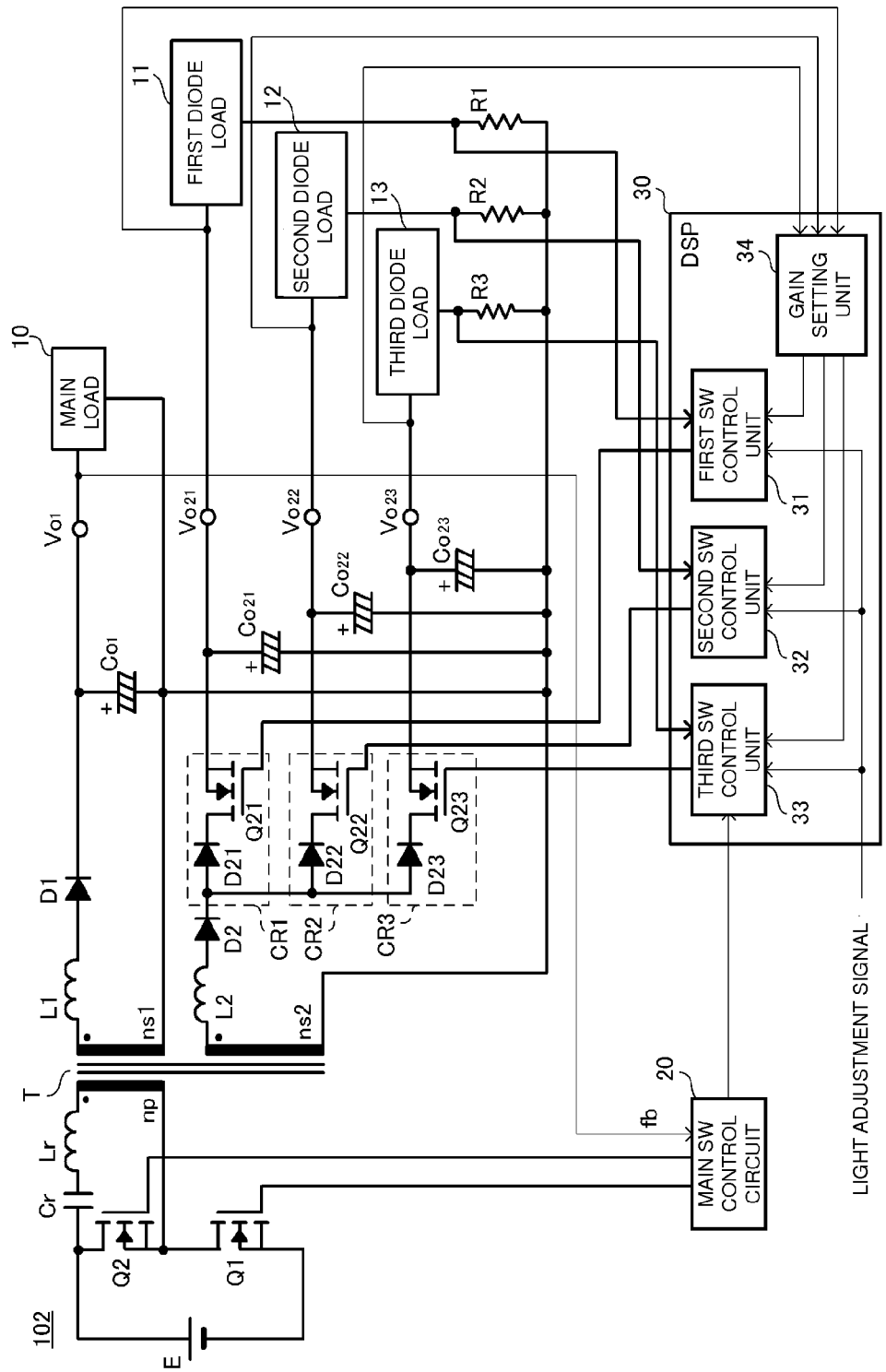
FIG. 6 is a circuit diagram of a diode load driving power supply apparatus according to preferred embodiment 2 of the present invention.

FIG. 6 is a circuit diagram of a diode load driving power supply apparatus according to preferred embodiment 2 of the present invention. The diode load driving power supply apparatus 101 according to preferred embodiment 1 preferably sets a corresponding feedback gain for every read forward drop voltage VF. In contrast, a diode load driving power supply apparatus 102 according to this preferred embodiment preferably compares the read forward drop voltages VF and allocates smaller feedback gains as the forward drop voltages VF decrease.

In addition, the secondary side of the transformer T of the diode load driving power supply apparatus 102 according to this preferred embodiment is different from that of the diode load driving power supply apparatus 101 according to preferred embodiment 1. Hereafter, the circuit configuration of the secondary side of the transformer T will be described. Components that are the same as those in preferred embodiment 1 will be denoted by the same symbols and description thereof will be omitted.

The transformer T includes two secondary windings ns1 and ns2. A main rectifying/smoothing circuit is connected to the secondary winding ns1. The main rectifying/smoothing circuit includes the inductor L1, the first rectifying element D1 and the smoothing capacitor $Co_1$ and supplies a main output voltage $Vo_1$ to the main load 10, which is downstream, via a DC-DC converter, which is not illustrated.

An inductor L2 and a diode D2 are connected to the secondary winding ns2. First, second and third rectifying/smoothing circuits are connected to the cathode of the diode D2. The first, second and third rectifying/smoothing circuits preferably have the same configurations as in preferred embodiment 1.

In this preferred embodiment, a configuration is adopted in which the separate induced voltages of the secondary windings ns1 and ns2 are supplied to the main load 10 and to the first diode load 11, the second diode load 12 and the third diode load 13.

The diode load driving power supply apparatus 102 is equipped with the main SW control circuit 20 that controls switching of the low-side switch element Q1 and the high-side switch element Q2. In addition, the diode load driving power supply apparatus 102 is equipped with the DSP 30, which has a plurality of functions such as those of the first SW controller 31, the second SW controller 32, the third SW controller 33 and the gain setter 34.

The first SW controller 31, the second SW controller 32 and the third SW controller 33 preferably function in the same way as in preferred embodiment 1.

The gain setter 34 compares the read forward drop voltages VF and sets larger feedback gains as the forward drop voltages VF increase. For example, in the case where a forward drop voltage VF1 of the first diode load 11, a forward drop voltage VF2 of the second diode load 12 and a forward drop voltage VF3 of the third diode load 13 have the relationship VF2<VF3<VF1, the feedback gains set by the gain setter 34 increase in the order of that of the second SW controller 32, that of the third SW controller 33 and that of the first SW controller 31.

The three feedback gains to be allocated are prepared (stored) in the gain setter 34 of this preferred embodiment. That is, the gain setter 34 possesses in advance set feedback gains. The three feedback gains define a single combination and a plurality of such combinations may be prepared (stored). The gain setter 34 sets the feedback gains for the first SW controller 31, the second SW controller 32 and the third SW controller 33 such that the set feedback gains increase as the sizes of the forward drop voltages VF increase.

Operations other than setting of the feedback gains by the gain setter 34 are preferably the same as in preferred embodiment 1.

As described above, the diode load driving power supply apparatus 102 according to this preferred embodiment is capable of significantly reducing or preventing start up variations such as overshoot generated in the rise of a load current for each first diode load 11 (12, 13), similarly to as in preferred embodiment 1.

Here, the number of diodes used in the first diode load 11, the second diode load 12 and the third diode load 13 may be different depending on the product specification. There may still be differences even if the numbers of diodes are the same. Accordingly, in the case where there are, for example, specification A, specification B and specification C as examples of product specifications having different numbers of diodes, it is desirable that a plurality of combinations of feedback gains be prepared (stored) for a product with specification A, a plurality of combinations of feedback gains be prepared (stored) for a product with specification B and a plurality of combinations of feedback gains be prepared (stored) for a product with specification C in the gain setter 34.

The gain setter 34 first determines from the read forward drop voltage VF which of specification A, specification B and specification C, a product specification is. Next, the optimum combination is chosen from among the combinations of feedback gains prepared (stored) for the individual specifications and the feedback gains are set for the first SW controller 31, the second SW controller 32 and the third SW controller 33. By determining the product specifications in advance, it becomes easy to set optimum feedback gains even in a case where the number of diodes differs depending on the product specification.

In addition, the number of diodes are determined by determining the product specification from the forward drop voltages VF read by the gain setter 34 and the DSP 30 receives information detailing this, and as a result a set value of a protection function such as low voltage protection possessed by the DSP 30 can be changed to an optimum value corresponding to the number of diodes.

Preferred Embodiment 3

Figure 7:
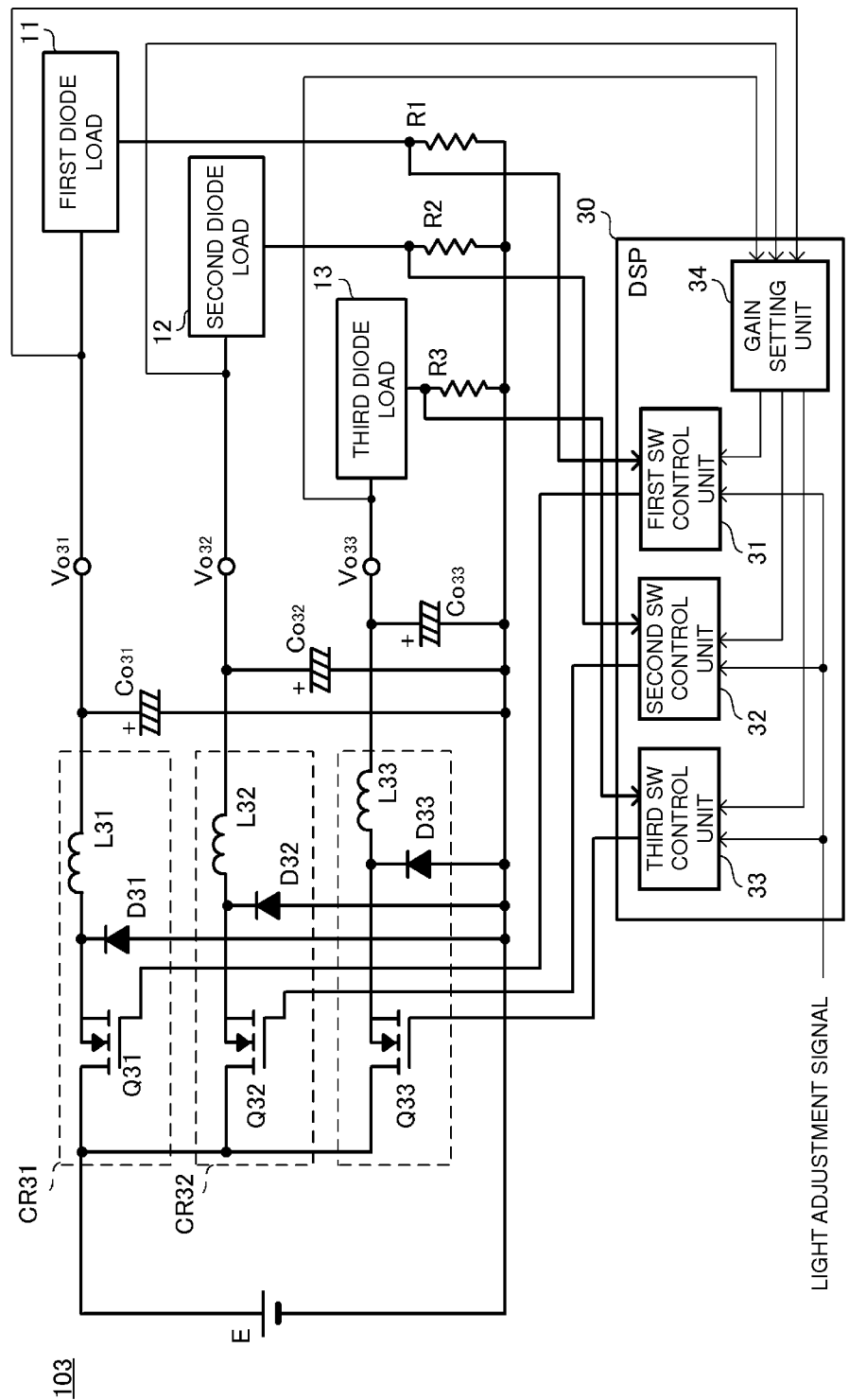
FIG. 7 is a circuit diagram of a diode load driving power supply apparatus according to preferred embodiment 3 of the present invention.

FIG. 7 is a circuit diagram of a diode load driving power supply apparatus according to preferred embodiment 3 of the present invention. A diode load driving power supply apparatus 103 according to this preferred embodiment differs from those of preferred embodiments 1 and 2 in that it is not equipped with a transformer T and is equipped with a step down converter. This difference will be described below.

The diode load driving power supply apparatus 103 is equipped with a first rectifying/smoothing circuit, a second rectifying/smoothing circuit and a third rectifying/smoothing circuit connected to an input power supply E.

The first rectifying/smoothing circuit includes a first switching circuit CR31 and a smoothing capacitor $Co_{31}$. The first switching circuit CR31 is a step down converter circuit that includes a switch element Q31, a diode D31 and an inductor L31. The first rectifying/smoothing circuit switches and then rectifies and smoothes the voltage from the input power supply E generate an output voltage $Vo_{31}$. The output voltage $Vo_{31}$ is supplied to the first diode load 11 connected downstream of the first rectifying/smoothing circuit.

The second rectifying/smoothing circuit includes a second switching circuit CR32 and a smoothing capacitor $Co_{32}$. The second switching circuit CR32 is a step down converter circuit that includes a switch element Q32, a diode D32 and an inductor L32. The second rectifying/smoothing circuit switches and then rectifies and smoothes the voltage from the input power supply E to generate an output voltage $Vo_{32}$. The output voltage $Vo_{32}$ is supplied to the second diode load 12 connected downstream of the second rectifying/smoothing circuit.

The third rectifying/smoothing circuit includes a third switching circuit CR33 and a smoothing capacitor $Co_{33}$. The third switching circuit CR33 is a step down converter circuit that includes a switch element Q33, a diode D33 and an inductor L33. The third rectifying/smoothing circuit switches and then rectifies and smoothes the voltage from the input power supply E to generate an output voltage $Vo_{33}$. The output voltage $Vo_{33}$ is supplied to the third diode load 13 connected downstream of the third rectifying/smoothing circuit.

In addition, the diode load driving power supply apparatus 103 is equipped with the DSP 30. The DSP 30 includes the first SW controller 31, the second SW controller 32, the third SW controller 33 and the gain setter 34. These components preferably are the same as in preferred embodiments 1 and 2. The gain setter 34 may obtain and set feedback gains corresponding to the forward drop voltages VF from among feedback gains determined from experiments or experience and stored in advance in a storage device or may set feedback gains calculated using a computational formula. The gain setter 34 outputs a set feedback gain to the first SW controller 31 (32, 33) corresponding to the forward drop voltage VF used in the setting operation.

As described above, the diode load driving power supply apparatus 103 according to this preferred embodiment is capable of significantly reducing or preventing start up variations such as overshoot generated in the rise of a load current for each first diode load 11 (12, 13), similarly to as in preferred embodiments 1 and 2. The switching circuit illustrated in FIG. 7 is a diode rectification type switching circuit, but may instead be a synchronous rectification type switching circuit.

In addition, in this preferred embodiment, description has been given of a three output diode load configuration, but the present invention can also be applied to a configuration with two or four or more outputs, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A diode load driving power supply apparatus, comprising:
   a plurality of switch circuits that each rectify, smooth and then output a voltage to a diode load through switching of a switch element; and
   a controller configured or programmed to control switching of the switch elements of the plurality of switch circuits and subject the plurality of diode loads to rated driving based on feedback gains, which are each a ratio of change in an on period or an on period ratio of a corresponding one of the switch elements with respect to a difference between a current supplied to a corresponding one of the diode loads and a desired current value; wherein the controller is configured or programmed to:
subject the diode loads to preliminary driving by supplying a current equal to or below a rated current;
obtain information regarding forward drop voltages of the diode loads in a preliminary driving period; and
set feedback gains of the switch elements of the switch circuits respectively connected to the diode loads in accordance with the forward drop voltages of the diode loads.

2. The diode load driving power supply apparatus according to claim 1, wherein the controller is configured or programmed to set, as feedback gains for switching control of the switch elements, smaller feedback gains as the forward drop voltages of the diode loads decrease.

3. The diode load driving power supply apparatus according to claim 1, wherein the controller possesses in advance a plurality of feedback gains.

4. The diode load driving power supply apparatus according to claim 3, wherein the controller is configured or programmed to determine a number of diodes used in each of the plurality of diode loads from the information regarding forward drop voltages and select one combination of feedback gains from among combinations of feedback gains possessed in advance.

5. The diode load driving power supply apparatus according to claim 1, wherein the controller is configured or programmed to obtain the on periods or on duty ratios of the switch elements as the information regarding the forward drop voltages.

6. The diode load driving power supply apparatus according to claim 1, further comprising a transformer including a primary winding and a secondary winding.

7. The diode load driving power supply apparatus according to claim 6, further comprising a main load, a first diode load, a second diode load, and a third diode load on a secondary side of the transformer.

8. The diode load driving power supply apparatus according to claim 6, wherein the secondary winding includes a plurality of center taps connected to the plurality of switch circuits.

9. The diode load driving power supply apparatus according to claim 1, wherein each of the plurality of switch circuits includes an inductor, a smoothing capacitor, and a switching circuit including a diode and one of the switch elements.

10. The diode load driving power supply apparatus according to claim 1, wherein the controller includes a digital signal processor.

11. The diode load driving power supply apparatus according to claim 10, wherein the digital signal processor is configured or programmed to define a first switching controller, a second switching controller, a third switching controller and a gain setter.

12. The diode load driving power supply apparatus according to claim 6, wherein the transformer includes two secondary windings.

13. The diode load driving power supply apparatus according to claim 12, wherein a first of the two secondary windings is connected to the plurality of switch circuits and a second of the two secondary windings is connected to an inductor and a diode.

14. The diode load driving power supply apparatus according to claim 1, further comprising a step down converter.

15. The diode load driving power supply apparatus according to claim 14, wherein the step down converter includes one of the switch elements, a diode and an inductor.

* * * * *